(12) United States Patent
Costes

(10) Patent No.: US 7,920,057 B2
(45) Date of Patent: Apr. 5, 2011

(54) METHOD AND DEVICE FOR LOCALIZATION OF THE POSITION OF A WHEEL OF A VEHICLE

(75) Inventor: Olivier Costes, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 594 days.

(21) Appl. No.: 11/997,322

(22) PCT Filed: Jun. 23, 2006

(86) PCT No.: PCT/EP2006/006051
§ 371 (c)(1),
(2), (4) Date: Jan. 30, 2008

(87) PCT Pub. No.: WO2007/014600
PCT Pub. Date: Feb. 8, 2007

(65) Prior Publication Data
US 2008/0224839 A1    Sep. 18, 2008

(30) Foreign Application Priority Data
Aug. 4, 2005    (FR) ...................................... 05 08313

(51) Int. Cl.
*B60C 23/00*    (2006.01)
(52) U.S. Cl. ..................... 340/444; 340/425.5; 340/441; 340/447; 340/438

(58) Field of Classification Search .................. 340/444, 340/438, 425.5, 441, 443, 445, 447
See application file for complete search history.

(56) References Cited

U.S. PATENT DOCUMENTS

| | | | |
|---|---|---|---|
| 5,483,220 A * | 1/1996 | Kushimoto et al. | ........... 340/444 |
| 6,871,157 B2 | 3/2005 | Lefaure | |
| 2006/0006992 A1 | 1/2006 | Daiss et al. | |

FOREIGN PATENT DOCUMENTS

| | | |
|---|---|---|
| DE | 102 26 995 A1 | 5/2004 |
| FR | 2 863 204 A | 6/2005 |
| FR | 2 872 949 A | 1/2006 |
| WO | 02/051654 A1 | 7/2002 |
| WO | 2005/018963 A1 | 3/2005 |

* cited by examiner

*Primary Examiner* — Daryl Pope
(74) *Attorney, Agent, or Firm* — Young & Thompson

(57) ABSTRACT

The invention relates to a method and a device for localization of the position of a wheel (2) of a vehicle (1). According to the method of the invention, the vehicle (1) is equipped with two transmitting antennas—a lateral antenna (11) and a frontal antenna (13)—placed so as to have coverage zones comprising a common zone in which is located the wheel (2) to be localized, and the transmission by the two transmitting antennas (11 and 13) of two identical, in phase identification request signals of powers suited to obtain in the area of wheel (2) to be localized a resulting signal of power greater than the detection threshold of an electronic box (6) with which said wheel is equipped is ordered simultaneously.

15 Claims, 6 Drawing Sheets

Figure 1:
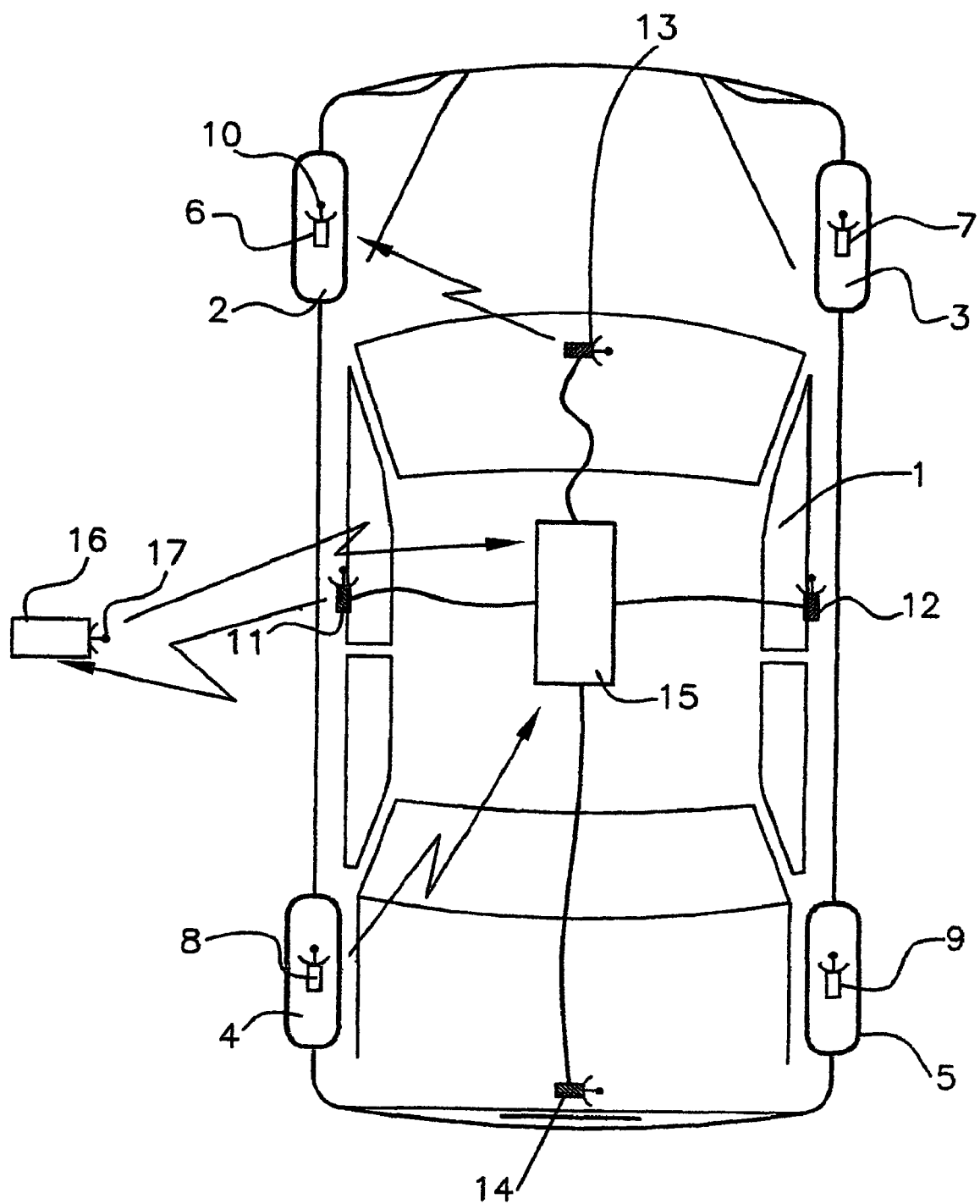

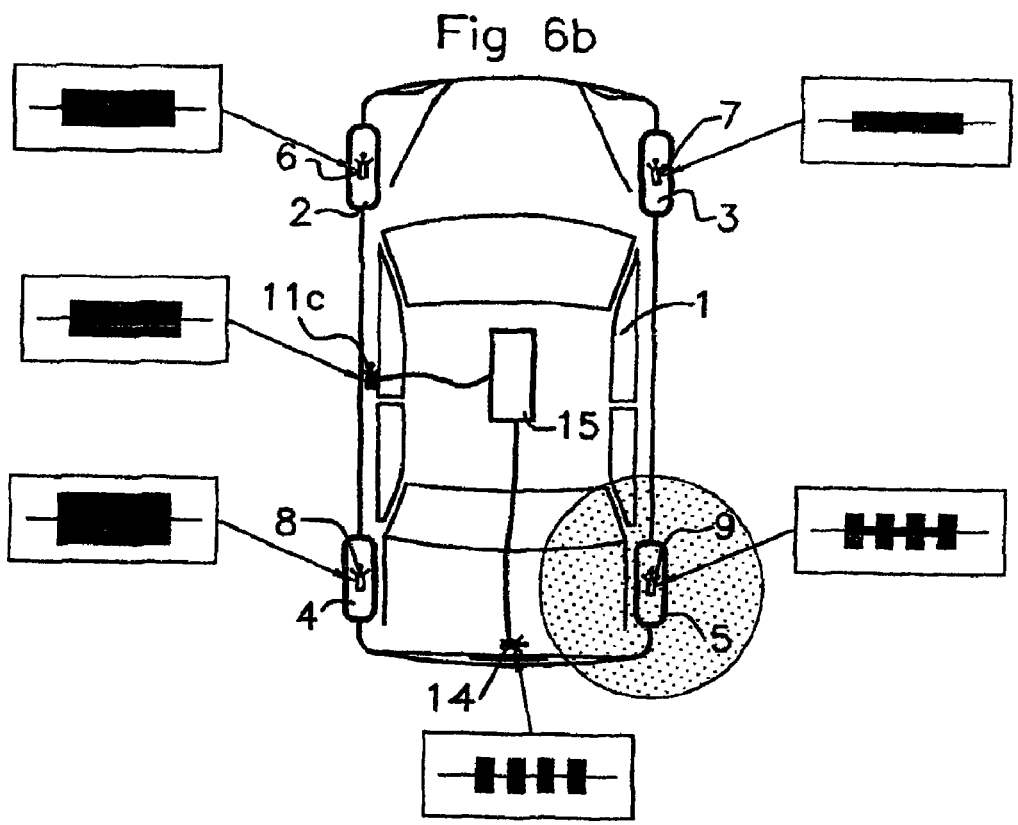
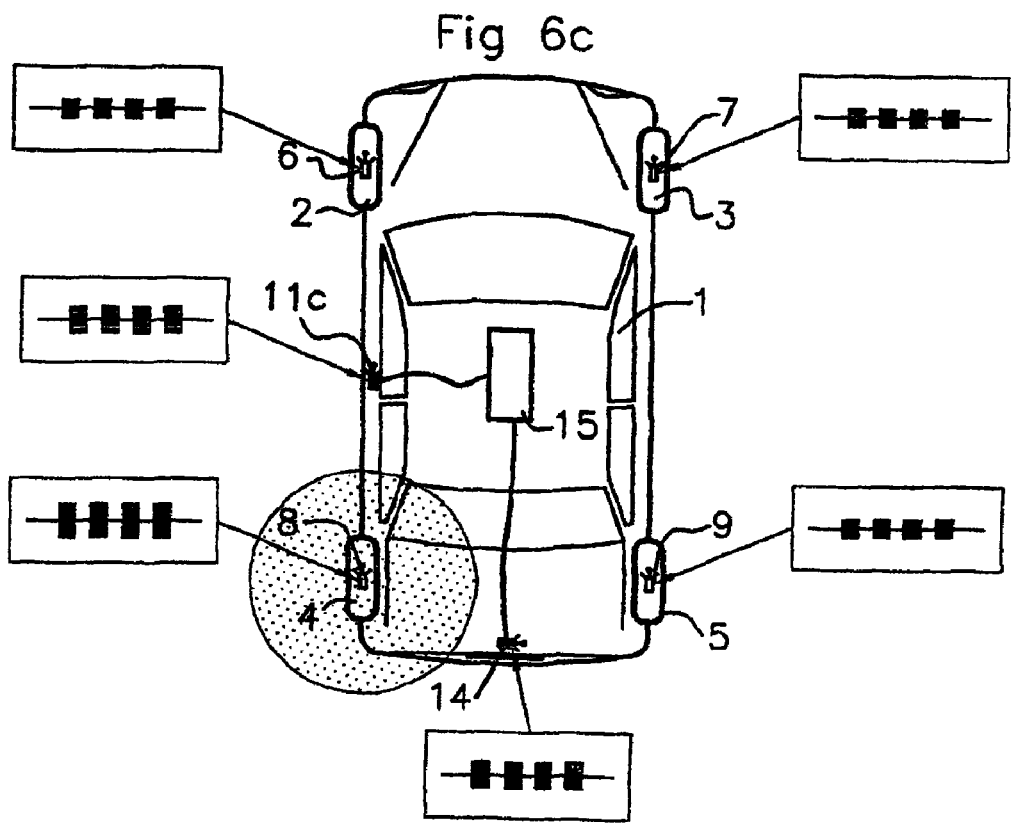

METHOD AND DEVICE FOR LOCALIZATION OF THE POSITION OF A WHEEL OF A VEHICLE

BACKGROUND OF THE INVENTION (1) Field of the Invention

The invention relates to a method and a device for localization of the position of a wheel of a vehicle equipped with an electronic box suited for transmitting, upon receiving an identification request signal whose power is greater than a predetermined detection threshold, signals representing operational parameters of said wheel comprising, further, an identification code for the latter, and directed at a central unit mounted on the vehicle.

The invention extends further to localization methods combining the method according to the invention and possible other methods of localization for performing the localization of all of the wheels of a vehicle It also extends to localization devices implementing such localization methods.

(2) Description of the Related Art

For safety reasons, more and more motor vehicles have monitoring systems comprising electronic boxes provided with sensors mounted on each of the wheels of the vehicle, which sensors are dedicated to the measurement of parameters such as pressure or temperature of the tires equipping these wheels, and are intended to inform the driver of any abnormal variation of the measured parameter.

These monitoring systems are conventionally provided with an electronic box mounted on each of the wheels of the vehicle and comprising a temperature and/or pressure sensor, a microprocessor and a radiofrequency transmitter (or RF transmitter), and a central unit for receiving signals transmitted by the transmitters, comprising a calculator integrating a radiofrequency receiver (or RF receiver) connected to an antenna.

One of the problems requiring resolution for such monitoring systems resides in the obligation of having to associate each signal received by the receiver in the central unit with information concerning the location of the box which transmitted the signal and therefore of the wheel at the origin of this signal; this obligation continues during the lifetime of the vehicle, that is to say it must be respected even after changing wheels or more simply rotation of the position of the wheels.

Currently, a first method of localization consists of using three low frequency antennas each positioned near one of the wheels of the vehicle and performing a localization procedure consisting of successively exciting each of these three antennas by the transmission of a low-frequency magnetic field.

According to this method, the sensor mounted on the wheel located near the excited antenna orders—in response to and directed at the central unit—the transmission of a low-frequency signal comprising an identification code of said sensor, such that successive excitation of the three antennas leads to the localization of the three electronic boxes mounted on the wheels adjacent these antennas, and by deduction, to the localization of the fourth box.

The principal advantage of such a method resides in the fact that the localization procedure is very fast and leads to a nearly instantaneous localization after starting the vehicle.

In contrast, this solution requires equipping the vehicle with three antennas with all the associated constraints: connection cables, command amplifiers, etc. which means that it proves costly.

This disadvantage concerning the installation cost of the means for implementing the localization method can be resolved when the vehicle is equipped with a hands-free access device intended to enable access to said vehicle and to start the latter.

Specifically, the solution then consists—as in particular described in the patent application WO 02/051654—of using transmitting antennas along with their power supply means incorporating a step-up transformer, for this hands-free access device, for implementing the wheel localization procedure.

As described in the aforementioned patent application, the implementation of this solution consists, for example, of commanding the transmission by the transmitting antennas of an uncoded signal when said antennas are used for localization of the wheels, and commanding the transmission of a coded signal during the use of the antennas for their original purpose of checking vehicle access.

Such a solution very attractive in theory proves in contrast very awkward to implement in practice. Specifically, the antennas for the hands-free access devices are not ideally positioned in order to enable the localization of the wheels of a vehicle.

Further, the cost of the "antennas/step-up transformer" assembly makes this solution inapplicable to a car not having a hands-free access device.

In conclusion, each of the two principal solutions currently implemented with a view to localizing the wheels of a vehicle firstly have a number of specific disadvantages and secondly offer no flexibility of use.

SUMMARY OF THE INVENTION

The present invention aims to remedy the disadvantages of the current localization methods described above, and has for main objective that of providing a high-performance localization method designed on the basis of allowing the localization of a vehicle wheel, but potentially capable of being associated with other methods for making it possible at lower cost, and for various equipment levels of a vehicle, to localize the other wheels of this vehicle.

For this purpose, the invention is directed, in the first place, at a method for localization of the position of a wheel of a vehicle equipped with an electronic box suited for transmitting—upon receiving an identification request signal whose power is greater than a predetermined detection threshold—signals representing operational parameters of said wheel further comprising an identification code for the latter, and directed at a central unit mounted on the vehicle. According to the invention, this localization method consists of:

equipping the vehicle with two transmitting antennas—a lateral antenna and a frontal antenna—placed so as to have coverage zones comprising a common zone in which the wheel to be localized is located, and simultaneously ordering the transmission by the two transmitting antennas of two identical, in-phase, identification request signals whose power is suited for obtaining—in the area of the wheel to be localized—a resulting signal whose power is greater than the detection threshold of the electronic box equipping said wheel.

It should be noted that in the entirety of the present application, the following are defined conventionally:

"lateral antenna": an antenna positioned in the area of one of the longitudinal sides of the vehicle, between the front wheel and the corresponding rear wheel, and adapted so that its zone of coverage encompasses both of these wheels, "frontal antenna": an antenna positioned and adapted so that its zone of coverage encompasses both wheels mounted on one axle.

The principle of the basic concept of the invention therefore rests in the control of the simultaneous transmission by both antennas of two in phase identification request signals such that the signal seen by the electronic box equipping the wheel to be localized consists of the resultant (vector addition) of both of these signals.

Because of this, the method according to the invention makes it possible to obtain all the advantages resulting from the presence of a step-up transformer without any excess installation cost, and therefore to provide a localization method that is as effective as a localization method using such a step-up transformer, without having to bear the corresponding cost.

Such a localization method can further constitute one of the steps of a general method for localization of the wheels of a vehicle, and thus be associated with other types of localization methods whose design can advantageously vary in order to be adapted to the equipment level of the vehicle.

A first advantageous solution for localization of the wheels of a vehicle thus consists, according to the invention, of departing from the base concept of the invention so as to successively localize, according to this concept, all the wheels of the vehicle.

According to this principle, the localization method for the wheels of a vehicle consists advantageously of:

Equipping the vehicle with four transmitting antennas consisting of two frontal antennas, respectively front and rear, and two lateral antennas, respectively right and left, positioned so as to form four pairs of transmitting antennas, respectively "front antenna/right antenna", "front antenna/left antenna", "rear antenna/right antenna" and "rear antenna/left antenna", where each has a coverage zone comprising a common zone in which extends a wheel to be localized, respectively right front wheel, left front wheel, right rear wheel, and left rear wheel, and Successively ordering a simultaneous and in phase transmission by the two transmitting antennas from at least three of the four antenna pairs so as to identify successively each of the corresponding wheels.

This first localization method is carried out by means of the installation of four antennas, but allows a fairly distant relative positioning of said antennas relative to the wheels without however requiring a step-up transformer because of the specifics of the base concept of the invention.

Further, since this method requires four antennas, the antennas of a hands-free access device equipping the vehicle suited for enabling access to said vehicle and for starting it are advantageously used, in order to implement the method.

A second advantageous solution for localization of the wheels of a vehicle makes it possible to reduce the number of transmitting antennas to three.

For this purpose, the localization method advantageously consists of:

Equipping the vehicle with three antennas consisting firstly of two lateral antennas, respectively right antenna and left antenna, each positioned near one of the two wheels, respectively right wheel and left wheel, of a single axle, and secondly one frontal antenna positioned near the other axle, where said frontal antenna and each lateral antenna have coverage zones comprising a common zone in which is located one wheel mounted on the axle neighboring the frontal antenna, Successively ordering the transmission by each of the lateral antennas of an identification request signal suited for having a power both greater than the detection threshold of the electronic box equipping the wheel located near said lateral antenna, and also less than the detection threshold of the other electronic boxes so as to successively localize each of the left and right wheels located near said lateral antennas, and Ordering the simultaneous transmission by one lateral antenna and the frontal antenna of two identical, in-phase, identification request signals whose power is suited for obtaining—in the area of the wheel located in the common zone of the coverage zones of said antennas—a resulting signal whose power is greater than the detection threshold of the electronic box equipping said wheel.

This reduction of the number of antennas is obtained by means of the positioning of the lateral antennas each near one wheel, in order to allow the "waking up" of this wheel by the transmission of a signal originating from this lone antenna without requiring increasing the power of said signal.

For these purposes, an advantageous solution consists of integrating the two lateral antennas each in a turn signal repeater positioned near a front wheel of the vehicle and positioning the frontal antenna near the rear axle of said vehicle.

A third advantageous solution for localization of the wheels of a vehicle makes it possible to reduce the number of transmitting antennas to two.

For this purpose, the localization method advantageously consists of:

Equipping the vehicle firstly with two antennas consisting of a lateral antenna and a frontal antenna placed so as to have coverage zones comprising one common zone in which one wheel is located and secondly a power supply means for said antennas comprising a step-up transformer enabling the transmission by each antenna of signals having in the area of each wheel located in the coverage zone of said antenna a power greater than the detection threshold of the electronic box with which said wheel is equipped, Performing a first localization procedure for one wheel during which:

Both antennas are powered by way of the step-up transformer,

The transmission by one of the two antennas of an identification request signal is ordered, Simultaneously with the transmission of the identification request signal, transmission by the other antenna of a parasite signal designed to jam the identification request signal is ordered, Performing a second procedure for localizing a wheel identical to the previous one and for which the role of the two antennas is reversed, and Performing a third localization procedure for a wheel performed without step-up transformer during which the simultaneous transmission by the two antennas of two identical, in phase identification request signals of powers suited for obtaining, in the area of the wheel located in the common zone of the coverage zones of said antennas, a resulting signal of power greater than the detection threshold of the electronic box equipping said wheel.

This reduction of the number of antennas is obtained by means of the implementation—with a view to localizing two wheels—of specific localization procedures requiring a step-up transformer, and whose selective nature results from the fact that during the transmission of an identification request signal by an antenna this signal can only be identified by the electronic box of the wheel both closest to said antenna, and also farthest from the other antenna.

In fact, each of the electronic boxes equipping the wheels receives an overall signal composed of a superposition of the identification request signal transmitted by a transmitting antenna and the parasite signal transmitted by the other antenna.

However, concerning the electronic box of the wheel closest to the antenna transmitting the identification request signal and farthest from the other antenna, the identification request signal is preponderant over the residual parasite signal. Consequently, the overall signal received has the general shape of the identification request signal and is therefore identified as being this request signal, leading in response to the transmission of a signal comprising the wheel identification code.

The other electronic boxes for their part receive an overall signal in which the parasite signal is preponderant over the residual identification request signal or comprising an identification request signal too weakened to be detected. Because of this, the overall signal is not identifiable by said boxes which therefore do not transmit any signal in response.

Further, advantageously according to this embodiment of the invention, the central unit orders the transmission of identification request signals consisting of "Manchester" coded signals.

The invention extends to localization devices intended to implement the basic method according to the invention for localizing a vehicle wheel, and general methods conforming to the invention for localizing wheels of a vehicle.

Other features, objects and advantages of the invention will emerge from the detailed description which follows with reference to the attached drawings which show three preferred embodiments thereof for the purpose of nonlimiting examples.

BRIEF DESCRIPTION OF THE DRAWING FIGURES

Figure 2:
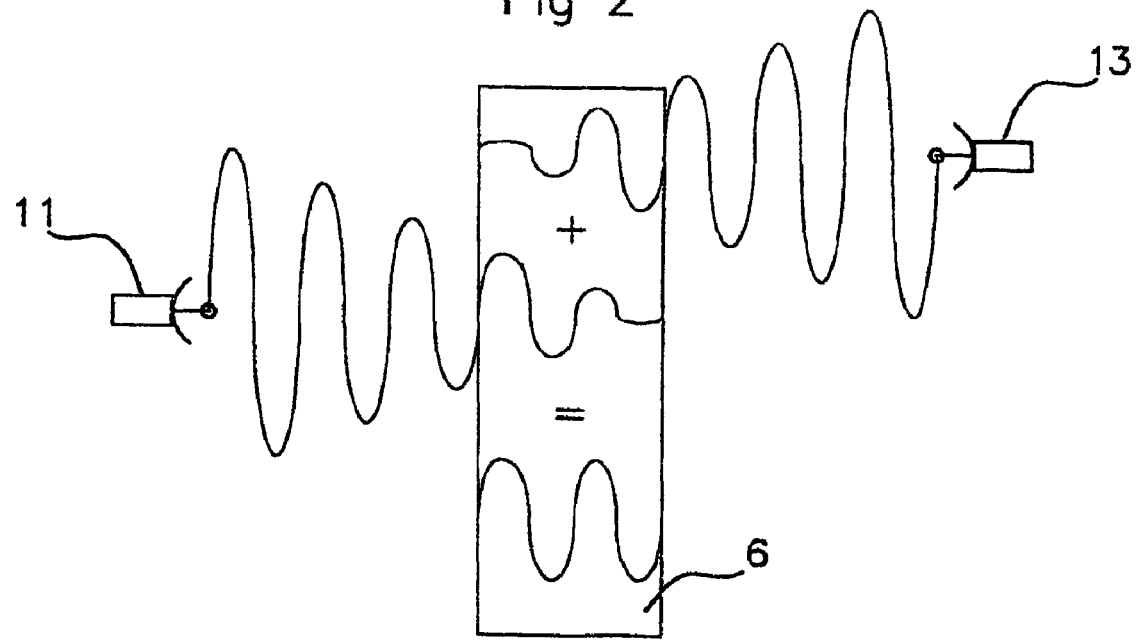
Figure 3A:
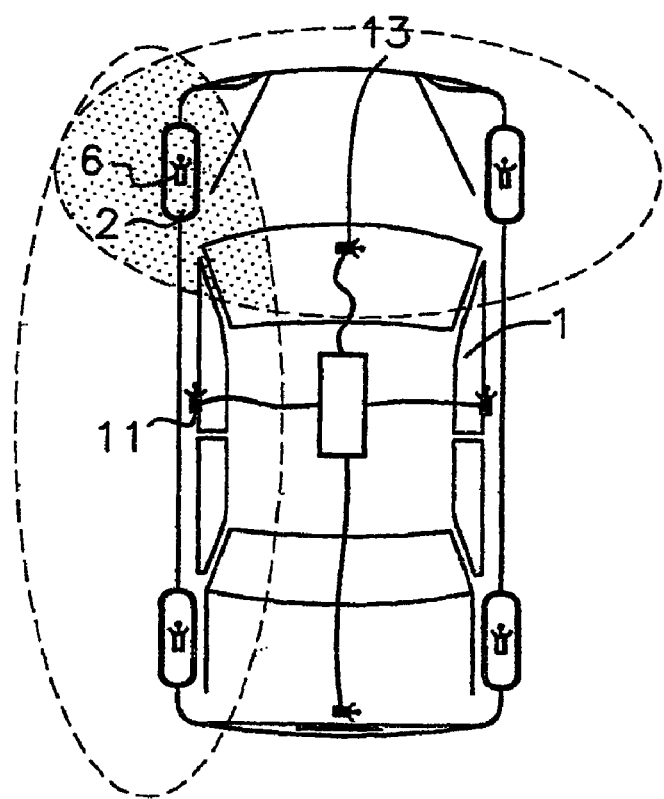
Figure 3B:
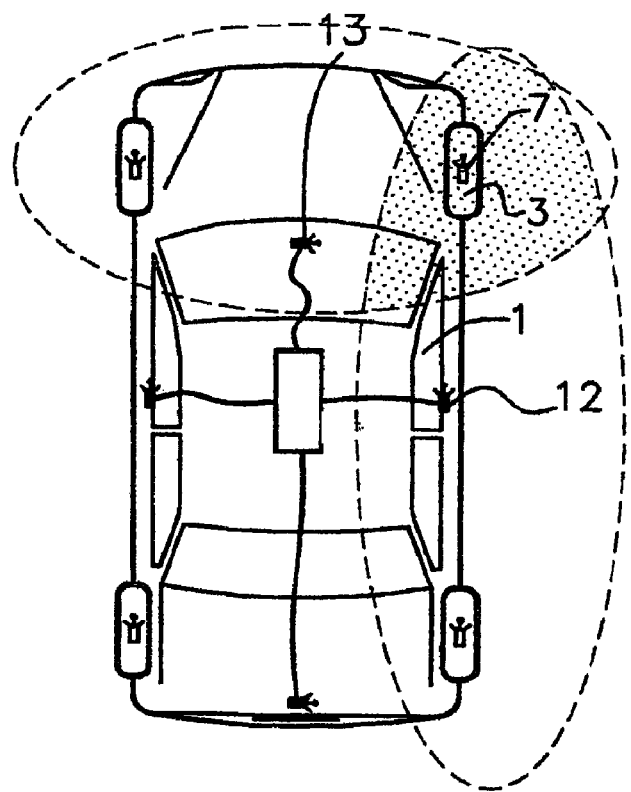
Figure 3C:
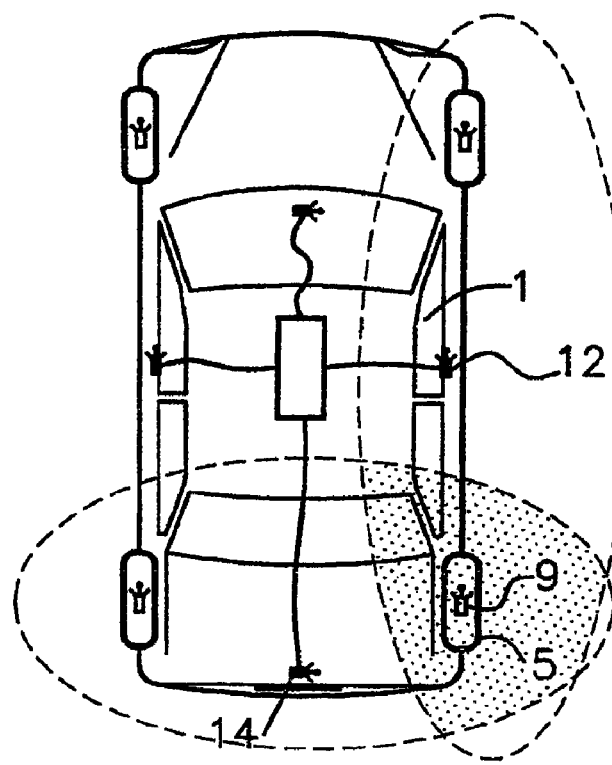
Figure 4:
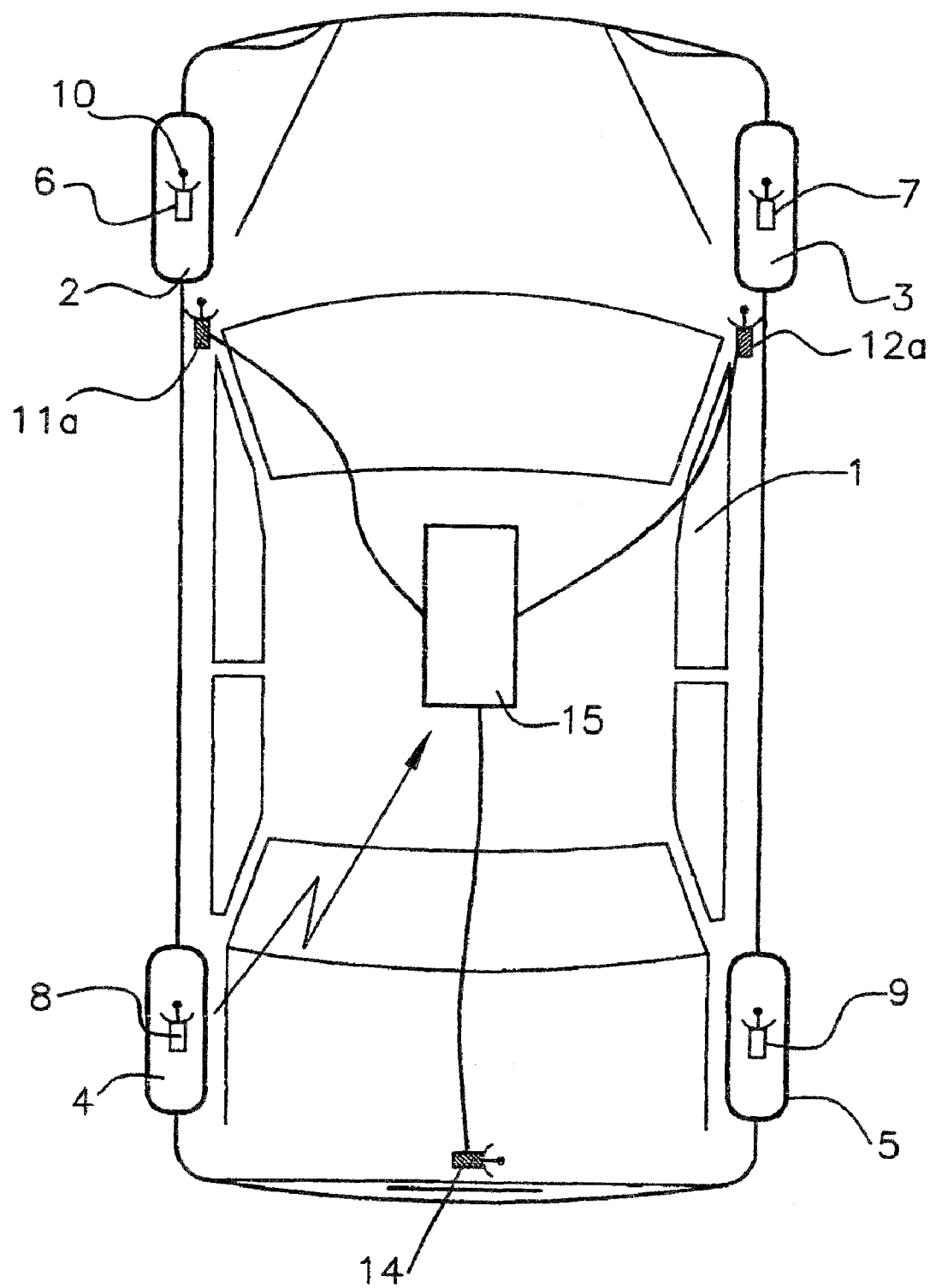
Figure 5:
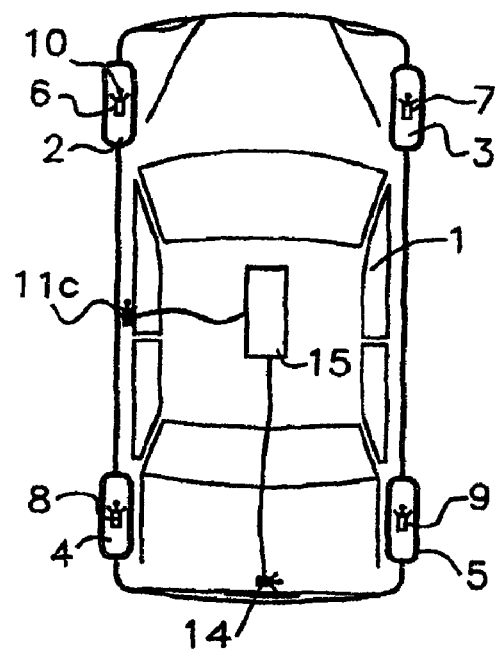
Figure 6A:
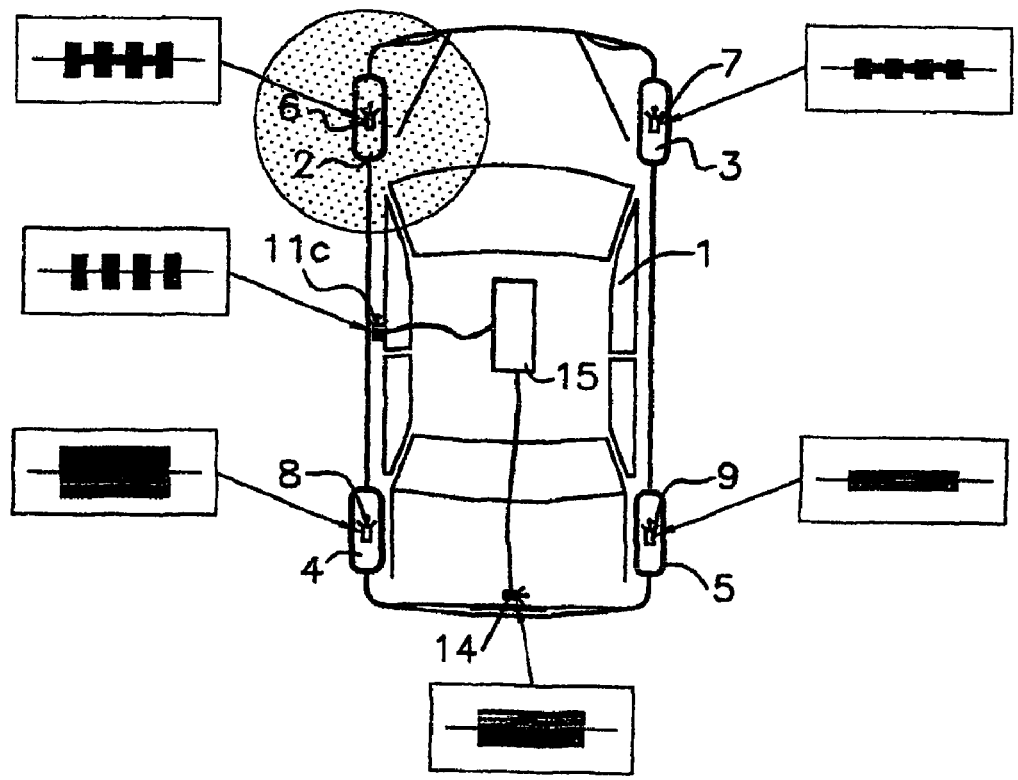

On these drawings:

FIG. 1 is a top view drawing of a vehicle fitted with a monitoring system associated with a first variant of the device according to the invention for localization of the wheels of said vehicle, FIG. 2 is a drawing illustrating the method of localization of one wheel implemented according to the invention, FIGS. 3a to 3c are three top view drawings similar to that from FIG. 1, illustrating the three localization steps implemented by the localization device shown in this FIG. 1 in order to localize the four wheels of the vehicle, FIG. 4 is a top view drawing of a vehicle fitted with a monitoring system associated with a second device variant according to the invention for localization of the wheels of said vehicle, FIG. 5 is a top view drawing of a vehicle fitted with a monitoring system associated with a third device variant according to the invention for localization of the wheels of said vehicle, and FIGS. 6a to 6c are three top view drawings similar to that from FIG. 5, illustrating the three localization steps implemented by the localization device shown in this FIG. 5 in order to localize the four wheels of the vehicle.

DESCRIPTION OF THE PREFERRED EMBODIMENTS

The localization devices according to the invention shown as examples respectively in FIGS. 1, 4 and 5 are intended for the localization of the position of wheels on a vehicle.

These localization devices are more specifically intended to be integrated in a monitoring system such as that shown in FIGS. 1, 4, and 5, equipping a vehicle 1 provided with four wheels with a conventionally mounted tire: two front wheels 2 and 3 and two rear wheels 4 and 5.

Such monitoring systems conventionally comprise, firstly, associated with each wheel 2-5, an electronic box 6-9, for example integrated on the rim of said wheel so as to be positioned inside the envelope of the tire.

Each of these electronic boxes 6-9 includes for example sensors dedicated to measurement of parameters such as tire pressure and/or temperature, which sensors are connected to a microprocessor having an identification code for said box, and connected to an RF transmitter connected to a low-frequency antenna 10.

The monitoring system also includes a centralized calculator or central unit 15 comprising a microprocessor and integrating an RF receiver suitable for receiving the signals transmitted by each of the four electronic boxes 6-9.

In the usual manner, such a monitoring system and in particular its central unit 15 are designed so as to inform the driver of any abnormal variation of the parameters measured by the sensors associated with the wheels 2-5.

The localization devices according to the invention for their part conventionally include transmitting antennas connected to the central unit 15 and intended to transmit identification request signals on reception of which each electronic box that is woken up, that is to say each electronic box receiving an identification request signal whose power is greater than a predetermined detection threshold, is suited for transmitting in response a signal including in particular its identification code.

According to the localization device shown in FIG. 1, these transmitting antennas 11-14 are made up of antennas from a device usually known under the name "hands-free access device," suited for enabling access to the vehicle 1 and potentially starting this latter through the identification of an electronic remote 16.

In conformance with the provisions of such a hands-free access device, there are four antennas consisting respectively of:

A left antenna 11 positioned on the front left door handle of the vehicle,

A right antenna 12 positioned on the front right door handle of the vehicle,

A front antenna 13 positioned in the area of the instrument panel of the vehicle, and A rear antenna 14 positioned on the handle of the trunk lid of the vehicle.

Obviously, the exact positioning of these antennas can vary as a function of the vehicle.

The electronic remote 16 for this hands-free access system for its part conventionally includes a calculator integrating a low-frequency LF receiver and a radiofrequency RF transmitter connected to an antenna such as 17.

This localization device is designed to split the localization procedure up into three successive steps enabling each one to locate one of the wheels (wheels 2 and then 3 and then 5 according to FIGS. 3a to 3c) by implementing the localization method for one wheel which is the object of the present invention.

For this purpose, and in the first place and conventionally:

The left antenna 11 has a coverage zone encompassing the two left lateral wheels 2 and 4, The right antenna 12 has a coverage zone encompassing the two right lateral wheels 3 and 5, The front antenna 13 has a coverage zone encompassing the two front wheels 2 and 3, and The rear antenna 14 has a coverage zone encompassing the two rear lateral wheels 4 and 5.

Thus, as it emerges in particular from FIGS. 3a to 3c:

The left antenna 11 and the front antenna 13 have zones of coverage comprising a common zone in which the left front wheel 2 is located (FIG. 3a), The right antenna 12 and the front antenna 13 have zones of coverage comprising a common zone in which the right front wheel 3 is located (FIG. 3b), The right antenna 12 and the rear antenna 14 have zones of coverage comprising a common zone in which the right rear wheel 5 is located (FIG. 3c), and The left antenna 11 and the rear antenna 14 have zones of coverage comprising a common zone in which the left rear wheel 4 (not shown) is located.

Further, according to the method of the invention and as illustrated in FIG. 2, in order to localize a wheel (wheel 2 equipped with an electronic box 6 according to FIG. 2), the central unit 15 orders the transmission by the two antennas having a common coverage zone in which said wheel is located (antennas 11 and 13 from FIG. 2) of two identical identification request signals:

Having in the area of the wheel 2 a power less than the detection threshold of the electronic box 6, Transmitting simultaneously and in phase in order to obtain, in the area of the wheel 2, a resulting signal of power greater than the detection threshold of the electronic box 6.

Thus, as previously mentioned, the simultaneous and in phase activation of the pair of antennas "left antenna 11/front antenna 13" enables localization of the left front wheel 2, as shown in FIGS. 2 and 3a.

Similarly, the simultaneous and in phase activation of the pair of antennas "right antenna 12/front antenna 13" enables localization of the right front wheel 3, as shown in FIG. 3b.

Finally, the simultaneous and in phase activation of the pair of antennas "right antenna 12/rear antenna 14" enables localization of the right rear wheel 5, as shown in FIG. 3c.

The localization of the last wheel—left rear wheel 4 in the example—is finally deduced from the three aforementioned localizations.

It should be noted that, obviously, the combination of three localized wheels according to the method of the invention may differ from the aforementioned combination.

Further, a fourth step implemented by using the pair of antennas not used during the preceding three steps ("left antenna 11/rear antenna 14" according to the above example) can serve for the localization of the fourth wheel (left rear wheel 4 according to the above example).

According to the second localization device variant shown in FIG. 4, there are three transmitting antennas that consist of:

A left antenna 11a positioned in the left turn signal repeater of the vehicle 1, consequently near the left front wheel 2 of said vehicle A right antenna 12a positioned in the right turn signal repeater of the vehicle 1, consequently near the left front wheel 2 of said vehicle and a rear antenna 14 positioned on the handle of the trunk door of the vehicle 1 and therefore identical to that of the localization device shown in FIG. 1.

According to this embodiment, the transmission by one of the left 11a or right 12a antennas of an identification request signal with power similar to that of the signals transmitted by the antennas from the first embodiment above is sufficient to "wake up" the electronic box 6, 7 of the neighboring front wheel 2, 3 because of the proximity of the repeaters relative to said front wheel.

The third wheel, rear wheel 4 or 5, for its part is localized by the implementation of the localization method for one wheel conforming to the invention, by ordering the transmission by the rear antenna 14 and one of the left 11a or right 12a antennas of identification request signals transmitted simultaneously and in phase.

The two localization devices described above in reference in particular to FIGS. 1 and 4 both have the advantage of being able to operate with low transmission powers for the identification request signals, and therefore not requiring the presence of a step-up transformer.

According to the third localization device variant shown in FIG. 5, there are two transmitting antennas that consist of:

A left antenna 11c positioned in the left front door handle of the vehicle 1 and therefore identical to the antenna 11 from the localization device shown in FIG. 1.

A rear antenna 14 positioned on the handle of the trunk lid of the vehicle 1 and therefore identical to the antenna 14 of the localization device shown in FIG. 1.

This localization device first implements a specific localization method requiring a step-up transformer in order for the identification request signals transmitted by the left antenna 11c and respectively by the rear antenna 14 have sufficient power to "wake up" the electronic boxes 6, 8 of both left wheels 2, 4 and respectively the electronic boxes 8, 9 of both the rear wheels 4, 5.

This localization method is broken down into two similar sub-steps allowing each one to localize one wheel and consisting for the first sub-step—as shown in FIG. 6a—of ordering:

The transmission by one of the two transmitting antennas—a left antenna 11c according to FIG. 6a—of an identification request signal Simultaneously with the transmission of the identification request signal, transmission by the other transmitting antenna—rear antenna 14 according to FIG. 6a—of a parasite signal designed to jam the identification request signal and to make it unidentifiable.

According to this procedure, only the left front wheel 2 receives an identification request signal identifiable by the electronic box 6 equipping this wheel 2.

In fact this wheel 2 receives an overall signal composed preponderantly by the identification request signal and comparable to it.

In contrast, the left rear wheel 4 located in the common zone of the coverage zones of both antennas 11c and 14 receives an overall signal composed in equal parts of the identification request signal and the parasite signal and consequently unidentifiable.

For its part the right rear wheel 5 receives an overall signal composed preponderantly of the parasite signal and therefore unidentifiable.

Finally, the right front wheel 3 receives an overall signal composed preponderantly of the identification request signal, but having a power less than the detection threshold of the electronic box 7 equipping this wheel 3.

This first sub-step therefore enables localization of the left front wheel 2 of the vehicle 1.

The second sub-step is similar to the first sub-step described above, with—as shown in FIG. 6b—the reversal of the role of the two antennas 11c and 14: transmission of an identification request signal by the rear antenna 14, and simultaneously transmission by the left antenna 11c of a parasite signal designed to jam the identification request signal.

According to this procedure, only the right rear wheel 5 receives an identification request signal identifiable by the electronic box 9 equipping this wheel 5.

In fact this wheel 5 receives an overall signal composed preponderantly by the identification request signal and comparable to it.

In contrast, the left rear wheel 4 located in the common zone of the coverage zones of both antennas 11c and 14 receives an overall signal composed in equal parts of the identification request signal and the parasite signal and consequently unidentifiable.

For its part the left front wheel 2 receives an overall signal composed preponderantly of the parasite signal and therefore unidentifiable.

Finally, the right front wheel 3 receives an overall signal of low power further composed preponderantly of the parasite signal.

This second sub-step therefore enables localization of the right rear wheel 5 of the vehicle 1.

Further, concerning these two localization sub-steps and as shown in FIGS. 6a and 6b, the identification request signals consist of "Manchester" coded signals.

The parasite signals designed for jamming the identification request signals for their part consist, as shown in FIGS. 6a and 6b, of signals comprising a portion of modulated signal whose length is at least equal to that of the "Manchester code".

Lastly, according to this third embodiment, the third wheel—left rear wheel 4 in the example—for its part is localized by the implementation of the localization method for a wheel conforming to the invention by commanding—as shown in FIG. 6c—a simultaneous and in phase transmission by both antennas 11c and 14 of identification request signals of power less than the detection threshold of the electronic boxes 5-9.

According to the principle of the invention and as shown in FIG. 6c, only the electronic box 8 of the left rear wheel 4 receives a signal resulting from the identification request having a power greater than the detection threshold of said electronic box, suitable to "wake up" the latter.

The localization of the last box (7) is determined by deduction.

The invention claimed is:

1. A method for localization of a position of a wheel (2) of a vehicle (1), the vehicle being equipped with a central unit (15), a transmitting frontal antenna (13, 14) connected to said central unit, and a transmitting lateral antenna (11, 12) connected to said central unit, said lateral antenna and said frontal antenna placed so as to have coverage zones comprising a common zone in which the wheel (2) to be localized is located, the wheel (2) equipped with an electronic box (6) configured for, upon receiving an identification request signal with a power greater than a predetermined detection threshold, transmitting to the central unit signals representing operational parameters of the wheel and an identification code for the wheel, said method comprising the steps of:

the central unit simultaneously ordering the transmission by the frontal antenna and the lateral antenna of two identical, in-phase, identification request signals, a power of a combination of the two said identification request signals, within the common zone in which the wheel (2) to be localized is located, being greater than the predetermined detection threshold of the wheel (2); and the electronic box, of the wheel receiving the combination of the two said identification request signals, responsively transmitting to the central unit the signals representing the operational parameters of the wheel and the identification code for the wheel.

2. The method of claim 1, wherein the vehicle is further equipped with a transmitting rear antenna (14) connected to said central unit, another transmitting lateral antenna (12) connected to said central unit, the another lateral antenna (12) being a right side antenna (12) located on a right side of the vehicle, the transmitting lateral antenna (11) being a left side antenna (11) located on a left side of the vehicle, said frontal antenna being a front antenna (13), said method further comprising:

said central unit selectively operating said front antenna (13), said rear antenna (14), said left side antenna, and said right side antenna as four pairs of transmitting antennas, the four pairs of transmitting antennas being i) the front antenna (13) and the right side antenna (12) pair having a coverage zone comprising a common zone covering a right front wheel (3), ii) the front antenna (13) and the left side antenna (11) pair having a coverage zone comprising a common zone covering a left front wheel (2), iii) the rear antenna (14) and the right side antenna (12) pair having a coverage zone comprising a common zone covering a right rear wheel (5), and iv) the rear antenna (14) and the left side antenna (11) pair having a coverage zone comprising a common zone covering a left rear wheel (4), each wheel being equipped with one of said electronic box (6, 7, 8, 9);

said central unit successively selectively ordering a simultaneous and in phase transmission by a different pair of the transmitting antennas so as to identify successively each of the corresponding left front wheel, right front wheel, right rear wheel, and left rear wheel.

3. The method of claim 2, further comprising:

using an electronic remote (16), in communication with at least one of said transmitting antennas, to enable access to the vehicle and to start the vehicle.

4. The method of claim 1, wherein the vehicle comprises a left front wheel, a right front wheel, a left rear wheel, and a right rear wheel, each wheel being equipped with one of said electronic box (6, 7, 8, 9), the vehicle further equipped with another transmitting lateral antenna (12a) connected to said central unit, the transmitting lateral antenna (11a) being a left side antenna (11a) located on a left side of the vehicle near one of the left rear wheel and the left front wheel, the another lateral antenna (12a) being a right side antenna (12a) located on a right side of the vehicle near one of the front right wheel and the rear right wheel, said frontal antenna being one of a front antenna (13) and a rear antenna (14) and located at an end of the vehicle opposite the left side antenna and the right side antenna, said method further comprising:

said central unit selectively operating respectively one of said left side antenna (11a) and said right side antenna (12a) to transmit an identification request signal both greater than the predetermined detection threshold of the electronic box of the corresponding wheel located near said one antenna, the identification request signal being less than the predetermined detection threshold of the electronic boxes of the other wheels not near said one antenna; and said central unit simultaneously operating said frontal antenna and selectively operating one of said left side antenna (11a) and said right side antenna (12a) to transmit two identical, in-phase, identification request signals to thereby a) respectively create one of i) coverage zones with a common zone for the one of the left side wheels near the frontal antenna, and ii) coverage zones with a common zone for the one of the right side wheels near the frontal antenna, and b) respectively transmit an identification request signal within the common zone having a power both greater than the predetermined detection threshold of the electronic box of the corresponding wheel located within the common zone, the identification request signal being less than the predetermined detection threshold of the electronic boxes of the other wheels not within the common zone.

5. The method of claim 4, wherein,
the left side antenna (11a) is located within a left turn signal repeater of the vehicle,
the right side antenna (12a) is located within a right turn signal repeater, and
the frontal antenna (14) is positioned near a rear axle of the vehicle.

6. The method of claim 1, wherein the vehicle comprises four wheels, each wheel having one of the electronic box (6, 7, 8, 9), and the vehicle is further equipped with a power supply for said transmitting frontal and transmitting lateral antennas, the power supply comprised of a step-up transformer configured for providing, during the transmission by each of the two transmitting antennas (11c, 14) of signals having in the area of each of the wheels located in a coverage zone of said antennas, a power greater than the detection threshold of the electronic box of the corresponding wheel, said method comprising:

performing a first localization procedure for a first one of the wheels during which first localization procedure the two antennas (11c and 14) are supplied by the step-up transformer, including transmitting by a first of the two antennas (11c) of an identification request signal, simultaneously with the transmission of the identification request signal, transmission by a second of the two antennas (14) of a parasite signal designed to jam the identification request signal;

performing a second localization procedure for a second one of the wheels during which second localization procedure the two antennas (11c and 14) are supplied by the step-up transformer, including transmitting by the second of the two antennas (11c) of an identification request signal, simultaneously with the transmission of the identification request signal, transmission by the first of the two antennas (14) of a parasite signal designed to jam the identification request signal; and performing a third localization procedure for a third of the wheels, during which third localization procedure the two antennas (11c and 14) are not supplied by the step-up transformer, including the simultaneous transmission by the two antennas (11c and 14) of two identical, in phase identification request signals of powers sufficient for obtaining, in a common zone of the coverage zones of said antennas including the third of the wheels, a resulting signal of power greater than the detection threshold of the electronic box (8) of the third of the wheels.

7. The method of claim 6, wherein the identification request signals comprise Manchester coded signals.

8. A device for localization of the position of a wheel (2) of a vehicle (1), comprising:
a central unit (15),
a transmitting frontal antenna (13, 14) connected to said central unit,
a transmitting lateral antenna (11, 12) connected to said central unit,
said lateral antenna and said frontal antenna placed so as to have coverage zones comprising a common zone in which the wheel (2) to be localized is located,
the wheel (2) equipped with an electronic box (6) configured for, upon receiving an identification request signal with a power greater than a predetermined detection threshold, transmitting to the central unit signals representing operational parameters of the wheel and an identification code for the wheel,
wherein the central unit (15) implements a localization procedure comprising of simultaneously ordering the transmission by the frontal antenna and the lateral antenna of two identical, in-phase, identification request signals, a power of a combination of the two said identification request signals, within the common zone in which the wheel (2) to be localized is located, being greater than the predetermined detection threshold of the wheel (2).

9. The device of claim 8, wherein in response to the electronic box of the wheel receiving the combination of the two said identification request signals, the electronic box is configured to transmit to the central unit the signals representing the operational parameters of the wheel and the identification code for the wheel.

10. The device of claim 8, further comprising:
one of said electronic box (6, 7, 8, 9) located on each of four wheels of the vehicle;
a transmitting rear antenna (14) connected to said central unit and located on a rear of the vehicle;
another transmitting lateral antenna (12) connected to said central unit, the another lateral antenna (12) being a right side antenna (12) located on a right side of the vehicle,
said frontal antenna being a front antenna (13) located on a front of the vehicle,
said transmitting lateral antenna (11) being a left side antenna (11) located on a left side of the vehicle,
said transmitting antennas position on the vehicle to form four antenna pairs, the four pairs of transmitting antennas being
i) the front antenna (13) and the right side antenna (12) pair having a coverage zone comprising a common zone covering a right front wheel (3),
ii) the front antenna (13) and the left side antenna (11) pair having a coverage zone comprising a common zone covering a left front wheel (2),
iii) the rear antenna (14) and the right side antenna (12) pair having a coverage zone comprising a common zone covering a right rear wheel (5), and
iv) the rear antenna (14) and the left side antenna (11) pair having a coverage zone comprising a common zone covering a left rear wheel (4),
wherein said central unit implements a successive selectively ordering of a simultaneous and in phase transmission by a different two of the transmitting antennas so as to identify successively each of the corresponding left front wheel, right front wheel, right rear wheel, and left rear wheel.

11. The device of claim 8, further comprising:
an electronic remote (16), in communication with at least one of said transmitting antennas, enabling access to the vehicle and starting of the vehicle.

12. The device of claim 8, further comprising:
a left front wheel, a right front wheel, a left rear wheel, and a right rear wheel, each wheel being equipped with one of said electronic box (6, 7, 8, 9);

with another transmitting lateral antenna (12a) connected to said central unit, said another lateral antenna (12a) being a right side antenna (12a) located on a right side of the vehicle near one of the front right wheel and rear right wheel, said transmitting lateral antenna (11a) being a left side antenna (11a) located on a left side of the vehicle near one of the left rear wheel and the left front wheel, said frontal antenna being one of a front antenna (13) and a rear antenna (13) and located at an end of the vehicle opposite the left side antenna and the right side antenna, wherein, the central unit (15) implements a first localization procedure comprising successively ordering the transmission, by each of the left side antenna and right side antenna, of an identification request signal having a power both greater than the detection threshold of the electronic box of the wheel located near said lateral antenna and also less than the detection threshold of the other electronic boxes so as to successively localize each of the left wheel (2) and the right wheel (3) located near said lateral antennas, and the central unit (15) implements a second localization procedure comprising ordering the simultaneous transmission, by one lateral antenna (11a) and the frontal antenna (14), of two identical, in phase identification request signals of powers for obtaining in the area of the wheel (4) located in a common zone of the coverage zones of said one lateral and frontal antennas, a resulting signal of power greater than the detection threshold of the electronic box (8) of said wheel.

13. The device of claim 12,
the left side antenna (11a) is located within a left turn signal repeater of the vehicle,
the right side antenna (12a) is located within a right turn signal repeater, and
the frontal antenna (14) is positioned near a rear axle of the vehicle.

14. The device of claim 8, further comprising:
one of the electronic box (6, 7, 8, 9) on each of four wheels of the vehicle;
a power supply for said transmitting frontal and transmitting lateral antennas, the power supply comprised of a step-up transformer configured for providing, during the transmission by each of the two transmitting antennas (11c, 14) of signals having in the area of each of the wheels located in a coverage zone of said antennas, a power greater than the detection threshold of the electronic box of the corresponding wheel, wherein, the central unit (15) implements a first localization procedure for a first one of the wheels, during which first localization procedure the two antennas (11c and 14) are supplied by the step-up transformer, including transmitting by a first of the two antennas (11c) of an identification request signal, simultaneously with the transmission of the identification request signal, transmission by a second of the two antennas (14) of a parasite signal designed to jam the identification request signal, the central unit (15) implements a second localization procedure for a second one of the wheels, during which second localization procedure the two antennas (11c and 14) are supplied by the step-up transformer, including transmitting by the second of the two antennas (11c) of an identification request signal, simultaneously with the transmission of the identification request signal, transmission by the first of the two antennas (14) of a parasite signal designed to jam the identification request signal, and the central unit (15) implements a third localization procedure for a third of the wheels, during which third localization procedure the two antennas (11c and 14) are not supplied by the step-up transformer, including the simultaneous transmission by the two antennas (11c and 14) of two identical, in phase identification request signals of powers sufficient for obtaining, in a common zone of the coverage zones of said antennas including the third of the wheels, a resulting signal of power greater than the detection threshold of the electronic box (8) of the third of the wheels.

15. The device of claim 14, wherein the identification request signals comprise Manchester coded signals.

* * * * *